United States Patent [19]
Leonard

[11] Patent Number: 5,013,375
[45] Date of Patent: May 7, 1991

[54] METHOD AND APPARATUS FOR PRODUCING AN IMPROVED CAMOUFLAGE CONSTRUCTION

[75] Inventor: Robert R. Leonard, Spartanburg, S.C. 29302

[73] Assignee: Milliken Research Corporation, Spartanburg, S.C.

[21] Appl. No.: 377,083

[22] Filed: Jul. 7, 1989

[51] Int. Cl.⁵ .............................................. B32B 31/18
[52] U.S. Cl. ..................................... 156/61; 156/250; 156/270; 156/271; 156/290; 156/291; 156/292; 156/510; 156/516; 428/17; 428/919; 83/861
[58] Field of Search ................. 156/61, 250, 270, 271, 156/290, 291, 292, 510, 516; 428/919, 17; 83/861, 870, 874

[56] References Cited

U.S. PATENT DOCUMENTS

| | | | |
|---|---|---|---|
| 3,069,796 | 12/1962 | Ruter | 428/919 |
| 3,977,927 | 8/1976 | Amos et al. | 156/61 |
| 4,034,375 | 7/1977 | Wallin | 428/919 |
| 4,323,605 | 4/1982 | Rush | 428/17 |
| 4,375,488 | 3/1983 | Hogan | 428/17 |
| 4,493,863 | 1/1985 | Karlsson | 428/17 |
| 4,767,649 | 8/1988 | Birch | 428/99 |

*Primary Examiner*—Caleb Weston
*Attorney, Agent, or Firm*—Earle R. Marden; H. William Petry

[57] ABSTRACT

Method and apparatus for the manufacture of a composite camouflage construction having an open mesh net substrate, and a continuous sheet overlying the substrate and bonded thereto along plural spaced lines of attachment, with lobes of the sheet cut to simulate the appearance of leaves and foliage. Apparatus and method includes a sewing station for stitching the sheet along plural spaced lines of attachment to the substrate to form open-ended pockets or channels between the sheet and substrate. The cutting station spaces the sheet from the substrate and a heated cutting wire reciprocates between adjacent lines of stiches to cut the sheet, open the channel, and use a series of loose lobes simulating the appearance of natural objects of a terrain.

9 Claims, 4 Drawing Sheets

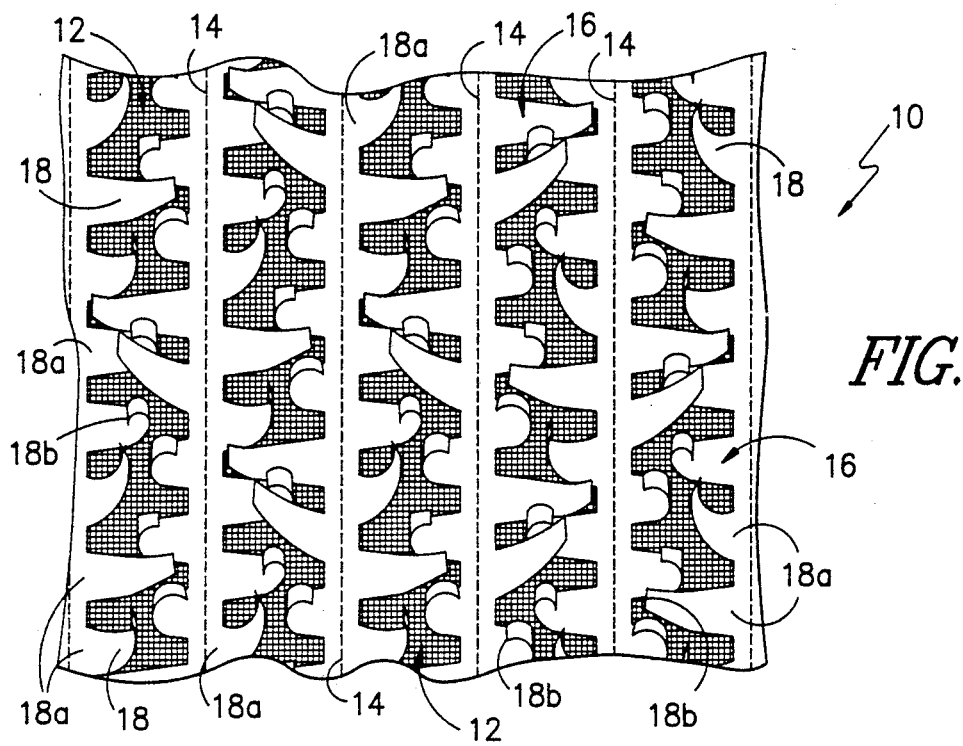
FIG. -1-
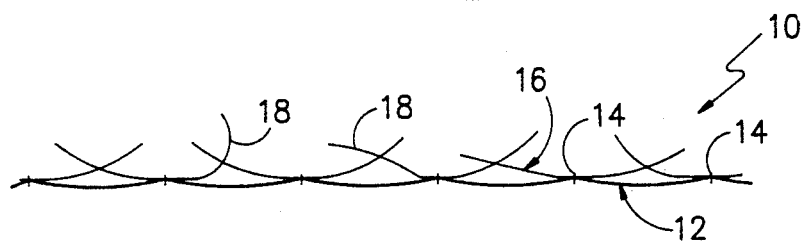
FIG. -2-
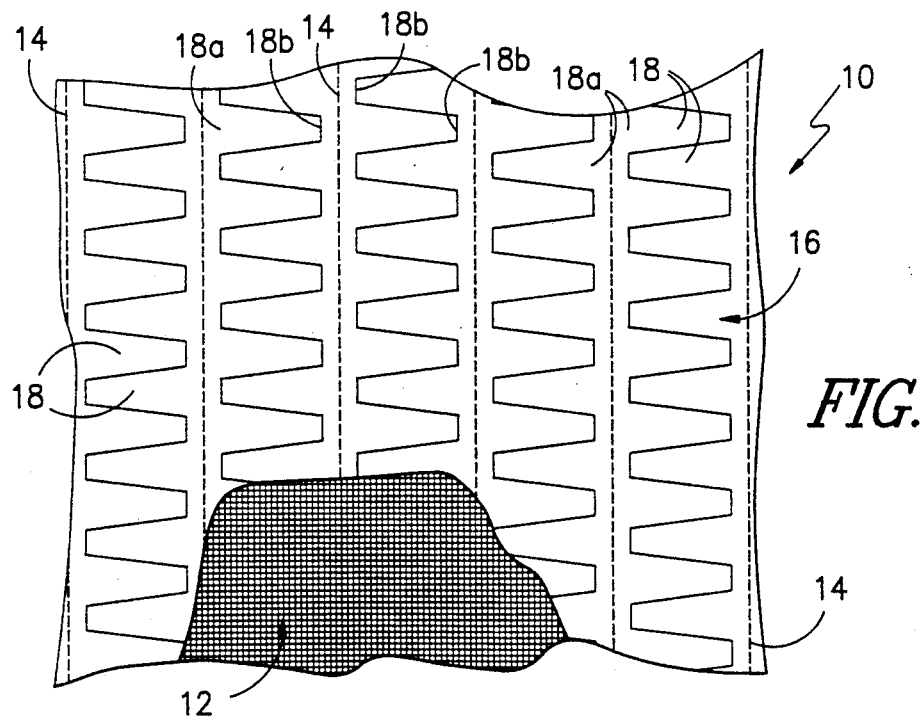
FIG. -3-

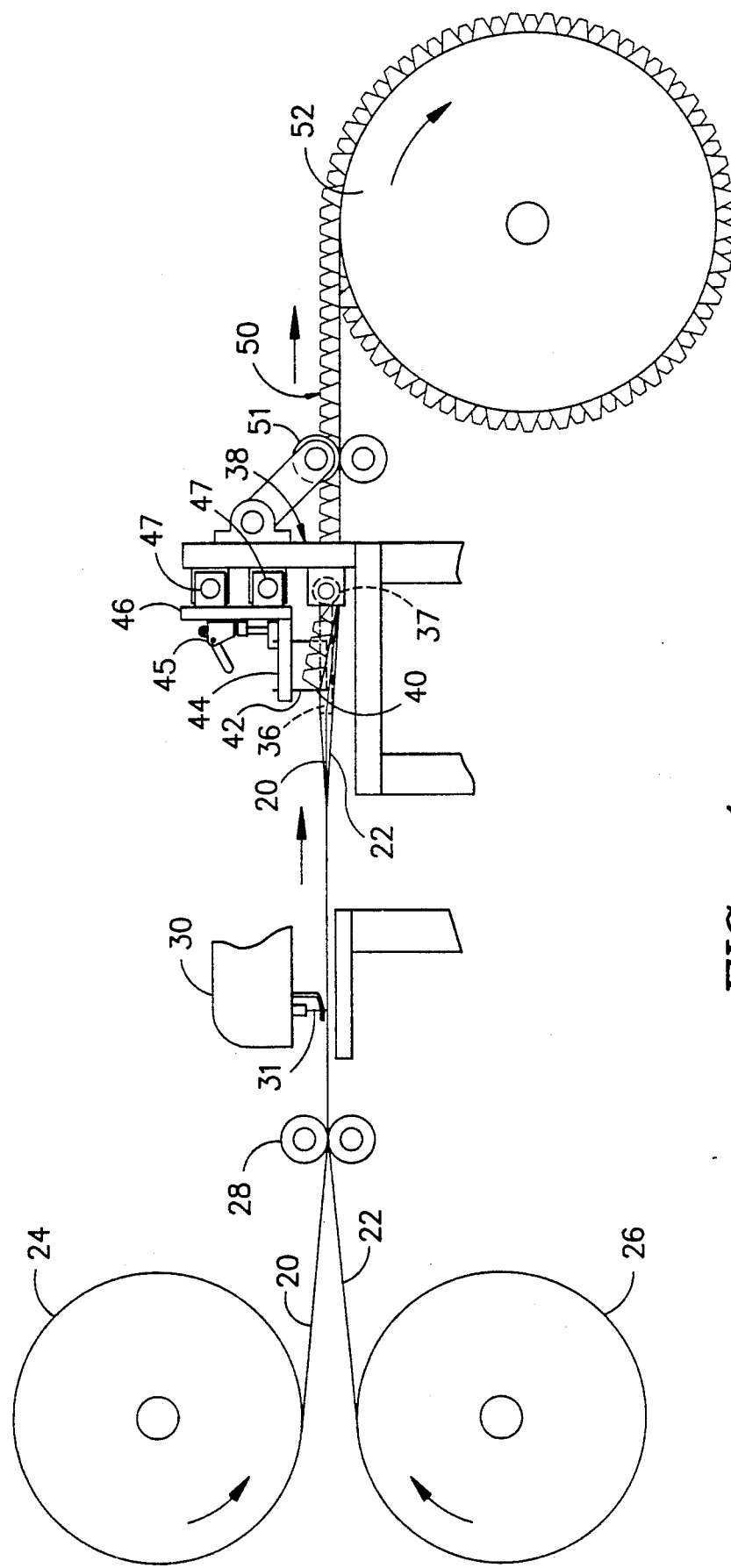
FIG. -4-

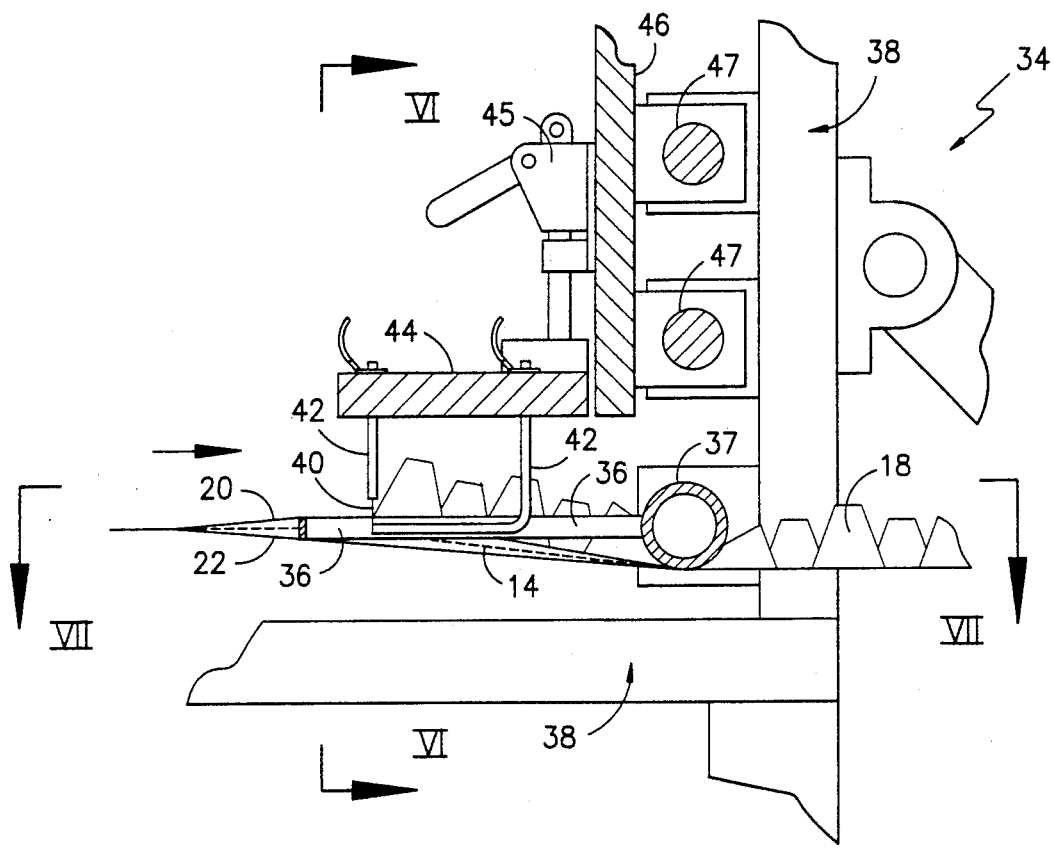
FIG. -5-
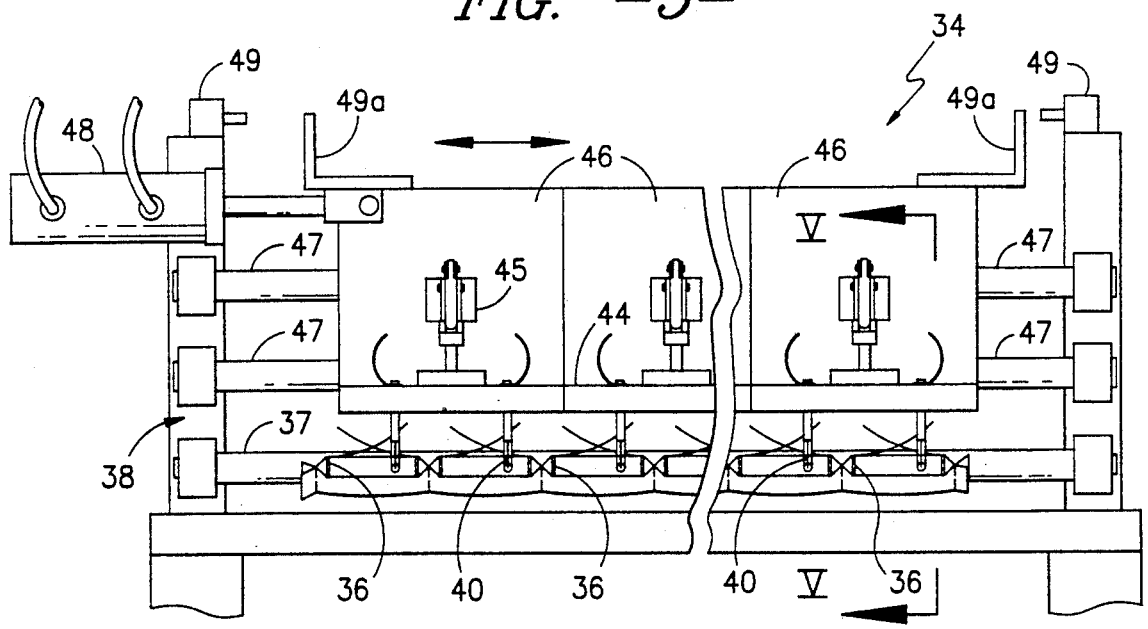
FIG. -6-

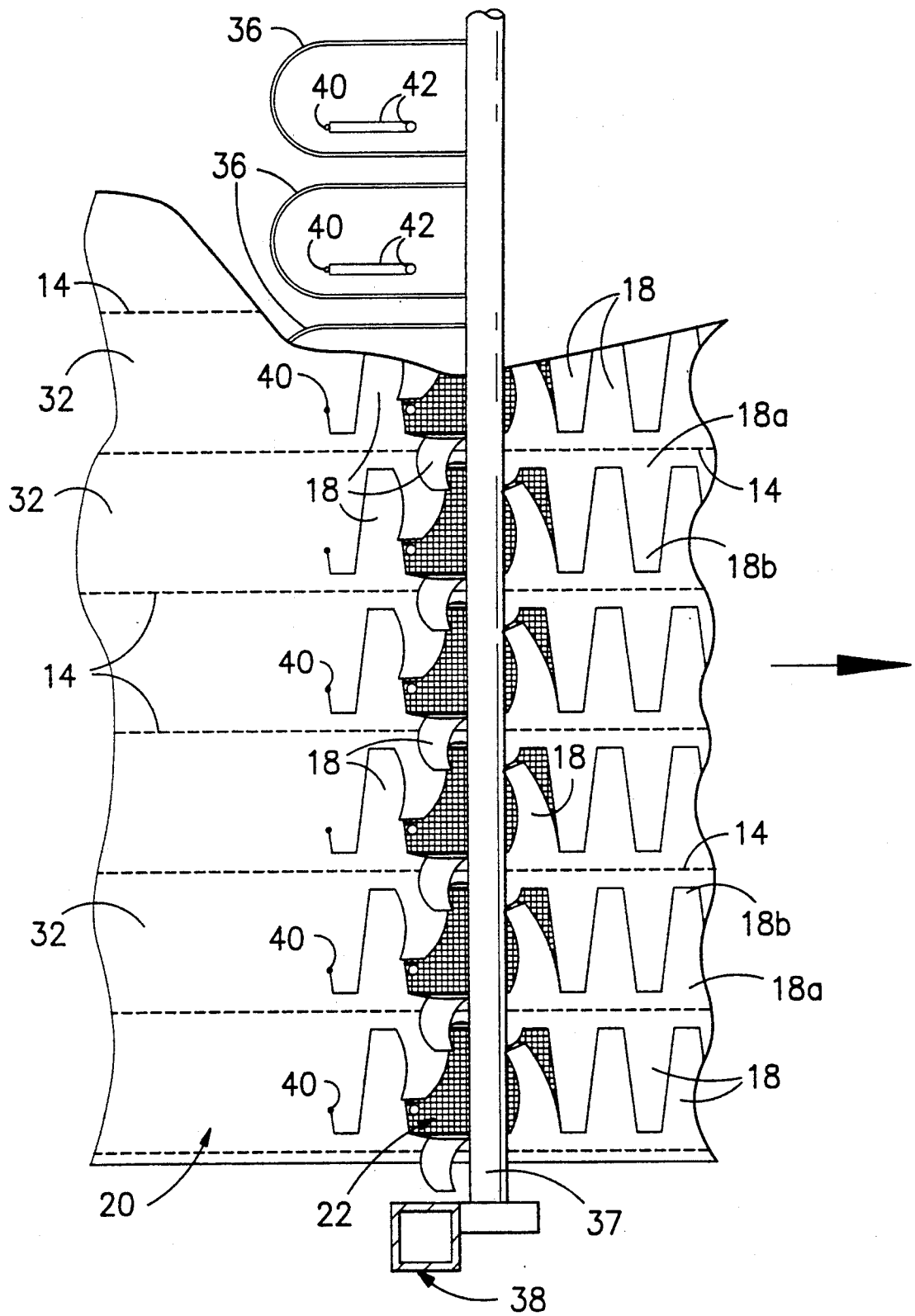
FIG. -7-

METHOD AND APPARATUS FOR PRODUCING AN IMPROVED CAMOUFLAGE CONSTRUCTION

The present invention is directed to method and apparatus for producing an improved camouflage construction, and more particularly, to method and apparatus for producing an ultralight-weight camouflage net system suited for tactical concealment of objects and equipment, particularly to conceal fixed and rotary wing aircraft employed in military field training exercises and combat operations.

BACKGROUND OF THE INVENTION

Camouflage materials have long been employed to conceal objects, personnel, and equipment in various terrains from visual detection. Generally, such camouflage materials are drapable sheets or net structures of varying size and shape and are solid color or dyed or printed in multiple color patterns to simulate the coloration of the terrain in which the camouflage is used, e.g., patterns of black, brown, and green, in combination. The camouflage material is supported or draped over and around the objects or equipment to be concealed, and multiple sections of the same or other shapes may be suitably joined at their edges to provide the particular size needed to cover the objects or equipment to be concealed.

U. S. Pat. Nos. 3,069,796; 4,323,605; and 4,375,488 disclose camouflage materials consisting of flexible sheets of two dimension in which a pattern of Cuts is made to provide holes and flaps simulating pieces of variously colored foliage. U. S. Pat. No. 4,493,863 discloses a laminated camouflage sheet composed of a blown low density polyethylene layer, a vaporized metal layer, an adhesion film, and a woven cloth layer. The blown plastic layer is die cut by stamping apparatus to form arcuate slits which form tongues under action of internal stresses to curl outwardly from the plane of the camouflage sheet.

Camouflage material is also known to be made of loosely woven synthetic polymeric strips joined together by a network of metal fasteners and hooks.

Camouflage materials which are used in military operations include a composite camouflage system having a large mesh support net to which a camouflage-colored, slit fabric sheet processed with pattern incising is attached by means of metal rings, referred to as hog rings. This type of camouflage system is relatively heavy in weight and difficult for personnel to handle in field operations. Present military camouflage net systems of the type employing large mesh nets and metal rings are not satisfactory for use with certain equipment, such as rotary and fixed wing aircraft, because a large mesh material easily snags on aircraft parts, such as rotor blades, weapons, antennas, and the like during installation and removal. In addition, metal rings and fasteners, such as the hog rings, can cause considerable damage to the equipment being concealed, such as abrasion of wind screen surfaces, control linkages, and engine components. Because of their heavy weight, such camouflage systems require extensive manpower to be located over and removed from the aircraft.

There is, therefore, a need for an acceptable lightweight camouflage net system which may be employed by minimum personnel to cover and conceal large military equipment, such as aircraft, which may be readily located over and removed from the equipment without snagging, and which may be easily maintained, stored, and transported to various geographical locations in the equipment to be concealed. Camouflage net systems for military use also are required to possess good resistance to weathering, and be usable under varying temperature conditions.

BRIEF OBJECTS OF THE PRESENT INVENTION

It is an object of the present invention to provide an improved process for producing a camouflage construction for use in concealment of objects, equipment, or personnel.

It is an object of the present invention to provide apparatus for producing lightweight camouflage construction suitable for use in concealment of objects, equipment, or personnel.

BRIEF DESCRIPTION OF THE DRAWINGS

The above, as well as further objects of the present invention will become more apparent, and the invention will be better understood from a detailed description of preferred embodiments thereof, when taken together with the accompanying drawings, in which:

FIG. 1 is a plan view depiction of a portion of the camouflage construction of the present invention, showing fabric lobes of the construction which simulate the appearance of natural objects in a geographic terrain, such as foliage or leaves;

FIG. 2 is a depiction of a cross-section of the construction shown in FIG. 1;

FIG. 3 is a plan view depiction of a portion of the camouflage construction of the present invention, showing the fabric lobes of the construction in flattened condition to better illustrate one pattern of cut which may be employed in forming the lobes of the construction., FIG. 4 is side elevation view depicting schematically principal components of apparatus for producing camouflage fabric;

FIG. 5 is an enlarged side sectional elevation view of the cutting head of the cutting station of the apparatus of FIG. 4, taken along line V—V of FIG. 6, and looking in the direction of the arrows;

FIG. 6 is a front elevation view of a portion of the cutting head station of the apparatus of FIGS. 4 and 5, looking generally in the direction of arrows VI-VI of FIG. 5; and FIG. 7 is a top plan view of a portion of the cutting head of the cutting station of the apparatus of FIG. 4 taken generally along line VII—VII of FIG. 5, and looking in the direction of the arrows.

SUMMARY OF THE INVENTION

The lightweight camouflage construction produced by the method and apparatus of the present invention is a composite product comprising an open mesh, net substrate to which is bonded a sheet material, such as a woven fabric, film, non-woven, or the like. The sheet is colored in a desired camouflage pattern bonded to the substrate along spaced lines of attachment, and cut to simulate the appearance of natural objects of a terrain, such as leaves or foliage, between adjacent lines of bonding to the net substrate.

In its formation, indefinite length webs of a net substrate and a continuous sheet may be combined in faced relation and stitch-bonded along spaced parallel continuous lines, as by use of a Malimo ® stitch-bonding machine or a quilting machine, to form continuous parallel channels or pockets along the length of the composite material. The composite net and sheet material is thereafter passed through a cutting machine having a plurality of generally U-shaped guide members disposed across the path of movement of the composite to enter each channel of the composite net and sheet and separate and space the net substrate from the sheet. As the composite moves through the guide members, a plurality of spaced heated cutting wires engage the sheet transversely reciprocate between the lines of stitches to cut a generally sinuous path through the sheet. The fabric lobes thus formed on each side of the lines of stitching to simulate the appearance of natural objects of a terrain, such as leaves or foliage.

DETAILED DESCRIPTION OF PREFERRED EMBODIMENTS

The lightweight camouflage construction of the present invention is illustrated by reference to FIGS. 1–3. FIG. 1 is a top plan view depiction of a portion of the camouflage construction, showing lobes which simulate the natural objects of a terrain, e.g., leaves or foliage, in a raised random orientation. FIG. 2 is a cross sectional depiction of the construction of FIG. 1, while FIG. 3 is a top plan view depiction of a portion of the construction showing the lobes of the construction in flattened condition in the plane of the supporting net substrate to better illustrate one pattern which may be employed by the cutting elements of the apparatus in forming the camouflage construction. As seen, the composite camouflage construction 10 comprises a drapable, small mesh net substrate 12, such as a textile Raschel knit fabric, which may be formed of a suitable textile yarn, such as nylon, polyester, or the like. Bonded to the supporting net substrate, in face-to-face relation therewith, and in parallel spaced lines of attachment along a length of the construction, as by thread stitches 14, is a continuous sheet 16 of suitable material, such as a woven nylon or polyester fabric of rip-stop construction. As seen, the continuous sheet 16 is cut between the adjacent parallel lines of stitching 14 to form a plurality of lobes 18, each lobe having a base portion 18a attached to the net substrate 12 by the bonding stitches 14, and a loose end portion 18b which is free of the substrate 12 to move in simulation of leaves or foliage.

The net substrate 12 and the fabric sheet 16 bonded thereto is colored, as by printing or dyeing, in a desired camouflage pattern. For example, the substrate may be dyed black, and the woven sheet may be dyed in various random patterns of green, brown, and black to conform to the colors of the terrain in which the camouflage construction is to be employed.

The overall size and shape of the camouflage construction may vary, depending upon size requirements of equipment or objects to be concealed thereby. Typically, individual camouflage construction units may be fifty foot by fifty foot squares, with the side edges of each unit being taped or sewn about its periphery. The edges of the units may further be provided with suitable attaching means, such as tie cords, or mating hook and loop pile fabric fasteners, to secure a number of individual units together and form a larger system of camouflage units.

The mesh size of the net substrate 12 may vary, but preferably is of small enough mesh size so as not to snag on equipment or objects to be concealed, e.g., parts of fixed or rotary wing aircraft. The mesh size also should be sufficient to permit passage of air therethrough and provide low wind-resistance of the camouflage constructions in their geographic areas of use.

The distance between the adjacent parallel lines of attachment 14 may be varied, depending upon the particular shape and size of the lobes 18 to be formed in the continuous sheet material 16. Typically, the lines of attachment may be in generally parallel rows spaced three inches apart along a length of the camouflage construction.

Although the net substrate 12 and the continuous sheet 16 may be formed of textile materials, such as woven, non-woven, or knit fabrics, it is contemplated that they may be formed of other material, such as a plastic laminate or a continuous plastic film, of suitable drapability, strength, and surface characteristics as to be pattern dyed in a camouflage configuration. Similarly, although the lines of attachment of the sheet and net substrate may be sewn stitches, as in a sewing stitch-bonding operation, it is contemplated that lines of attachment may be formed by other means, such as adhesive bonding, heat bonding, or the like, provided the bonding means does not incorporate materials which may damage, contaminate, or snag upon surfaces of the objects or equipment to be concealed by the camouflage construction. A typical camouflage construction of the present invention may be a 70 denier nylon Raschel knit net substrate having a mesh size of approximately 1/10 inch opening and a weight of about one ounce per square yard combined with 30 denier nylon woven rip-stop fabric having a $112 \times 118$ picks per inch count and weight of approximately one ounce per square yard.

Method and apparatus for producing the lightweight camouflage fabric in accordance with the present invention may be best described by reference to FIGS. 4–7. As seen in schematic side elevation view in FIG. 4, an indefinite length continuous sheet of material, such as a woven fabric 20, and an indefinite length web of the open mesh net substrate, such as a knitted mesh fabric 22, are directed from supply rolls 24, 26 by suitable guide means, such as rollers or bars 28, into contiguous facing relation along a desired path of travel. Spaced in the path of travel are bonding means, such as a sewing station 30 containing a plurality of individual sewing heads 31 spaced across the path to stitch the sheet to the substrate web along spaced parallel lines 14 (FIGS. 1 and 2) extending in the direction of movement of the sheet and substrate. Typically, the sewing means might be a Malimo® stitch-bonding machine which is well known and used in the industry. Stitch-bonding of the sheet and substrate along plural lines of attachment during its movement through the bonding means produces a plurality of continuous open-ended pockets or channels 32 (FIG. 7) in the composite bonded structure.

Positioned in the path of travel of the composite bonded sheet and substrate after the sewing station 30 are cutting means, located at a cutting station 34. As seen in FIGS. 4–7, cutting station 34 includes a plurality of generally U-shaped guides 36 mounted in spaced relation across the path of travel of the sheet and substrate on a cross member 37 of support frame 38. As the composite web moves in its longitudinal path of travel, the guides 36 pass into each of the channels 32 formed between adjacent lines of attachment of the sheet and substrate (FIGS. 5 and 7). Each U-shaped guide 36 is of sufficient thickness and height (FIG. 5) to separate and space the face of the sheet 20 from the face of the net substrate 22. Mounted for reciprocating movement, transverse to the path of travel of the composite sheet and substrate, are cutting means, shown as a plurality of electrically heated wires 40, each of which is mounted on conducting rods 42 of an insulator bar 44. Bar 44 is attached by an elevator mechanism 45 to a cross beam 46 on the support frame 38. The beam 46 is mounted on rods 47 for transverse reciprocation on frame 38, across the path of composite web travel. Beam 46 is reciprocated by suitable drive means, such as pneumatically controlled programmed piston motor 48. As best seen in FIGS. 5 and 6, each wire 40 extends downwardly to reside and reciprocate within the confines of each U-shaped guide member 36, and electrical energy is supplied from a suitable supply source to heat the wires to a desired temperature to cut the continuous sheet fabric 20 without contacting the supporting net substrate 22.

Operation of the pneumatic piston motor 47 thus reciprocates the beam 46 and each of the cutting wires 40 to move transversely back and forth within the confines of each of their U-shaped guide members as the composite sheet and web substrate move through the cutting station. The cutting wires cut the sheet 20, between its adjacent lines of attachment to the substrate, into a plurality of lobes 18, thus opening each of the channels formed in the composite sheet and net subtrate as it passes through the cutting station 34.

The particular shape and configuration of the lobes cut in the sheet may be varied, as desired, by adjustment of the speed of movement of the composite through the cutting station and the speed of reciprocation of the cutting wires. As illustrated in the drawings, pneumatic pressure may be supplied to opposite sides of the piston head of piston motor 48 from a suitable pneumatic pressure source (not shown) and through electrically operated solenoid control valves and pneumatic conduits (not shown). The valves may be operated in sequence to alternate the pressurized air flow between sides of the piston head by electrical signal activated through contact switches 49 located in the path of activator fingers 49a on the beam 46. Speed of movement of the cutting wires may be adjusted by adjustment of the pneumatic flow rate. Various programming means well known in the art might be employed to provide varying and various patterns of lobes, as desired. Operation of the cutting station may be computer-controlled, if desired.

As seen, heated cutting wires are reciprocated to provide a lobe configuration resembling a somewhat truncated triangle, the outer end 18a of each lobe 18 having a straight edge extending in the direction of the lines of attachment 14 and side portions of the lobe flaring to the base portion 18b which is attached to the substrate by stitches 14. Camouflage construction 50 leaving cutting station 34 passes through guide rolls 51 and is collected in suitable manner on collection roll 52. Various of the delivery, collection, or guide rolls of the apparatus may be driven, as desired, to move the continuous length of composite material through the apparatus.

The camouflage structure may be suitably dyed or printed in a desired camouflage configuration of random coloration. The sheet and substrate preferably may be dyed or printed prior to bonding and cutting. Typically, the net substrate which supports the continuous sheet may be dyed black, or a neutral background shade, and the continuous sheet may be patterned in random green, brown, and black coloration to conform to terrain in which the camouflage construction is employed. As mentioned, the particular mesh size of the net support substrate may be varied, but preferably it is sufficiently small in mesh size as to not snag on objects or equipment to be concealed. Similarly, the distance between the stitch lines of attachment of the sheet to the substrate may vary, depending upon the length and the size of the lobes desired for simulation of leaves or foliage.

If desired, the camouflage construction may be made reversible to present different camouflage patterns of coloration on opposite sides, e.g., a forest terrain and a desert terrain. Both faces of the net substrate may be bonded to continuous sheets, and both sheets cut, as described, to produce lobes simulating natural objects of a terrain. In such case, two cutting stations could be employed or the composite web run through a single cutting station twice.

That which is claimed is:

1. A method of producing a composite camouflage construction from a composite material comprising a net substrate in contiguous facing relation with a continuous sheet of material and bonded thereto along plural spaced lines of attachment extending along a length of the composite construction, comprising the steps of passing the composite construction in a desired path of travel while spacing the sheet from the substrate between adjacent lines of attachment, and cutting the sheet between its adjacent lines of attachment to the substrate to form a plurality of lobes, each lobe having a base portion attached to the net substrate and an outer end portion free from the substrate to simulate the appearance of natural objects of a terrain.

2. A method as defined in claim 1 wherein the sheet is cut to form alternating rows of lobes between adjacent lines of attachment of the sheet to the substrate.

3. A method of producing a composite camouflage construction comprising the steps of directing an indefinite length of a net substrate web and an indefinite length of a continuous sheet in contiguous faced relation, bonding the substrate and sheet to each other along plural spaced lines of attachment extending along the length of the sheet and substrate, and cutting the sheet between adjacent lines of attachment to the substrate to form a plurality of lobes, each lobe having a base portion attached to the net substrate and an outer end portion free from the substrate to simulate the appearance of natural objects of a terrain.

4. A method as defined in claim 3 wherein the substrate and sheet are bonded together by passing a length of the same in contiguous facing relation in a desired path of travel while bonding the same together along said lines of attachment to form with the sheet and substrate a plurality of channels, and said sheet is cut by opening each of the channels formed in the combined sheet and substrate to space the sheet from the substrate, and cutting the sheet along the length of each of the channels between the adjacent lines of attachment to open the channels and provide between adjacent lines of attachment lobes alternating along the length of the lines of attachment.

5. A method of producing a reversible composite camouflage construction from a composite material comprising a net substrate having a continuous sheet of material bonded in contiguous facing relation to opposite faces of the substrate along plural spaced lines of attachment extending along the length of the substrate and two continuous sheets of material, comprising the steps of passing the composite material in a desired path of travel, and cutting each of the sheets between its adjacent lines of attachment to the substrate to form a plurality of lobes on both sides of the substrate, each lobe having a base portion attached to the net substrate and an outer end portion free from the substrate to simulate the appearance of natural objects of a terrain.

6. Apparatus for producing a composite camouflage construction comprising means for conveying an indefinite length net substrate and a continuous sheet in contiguous facing relation along a desired path of travel, said substrate and sheet being bonded together along generally parallel spaced lines of attachment in the direction of their path of movement, means positioned in the path of movement for spacing apart the substrate and sheet between their parallel lines of attachment and for cutting the sheet between adjacent lines of attachment to form lobes in the sheet, each lobe having a base portion attached to the substrate, and an outer end portion free of the substrate whereby the lobes of the sheet simulate the appearance of natural objects of a terrain.

7. Apparatus as defined in claim 6 wherein said means positioned in the path of movement for spacing apart the substrate between their parallel lines of attachment comprise guide means positioned in the path of travel of the sheet and substrate for entering between the sheet and substrate between each of their adjacent lines of attachment for separating the contiguous faces of the same, and said means for cutting the sheet between said adjacent lines of attachment comprises a plurality of heated wire means mounted for reciprocal movement between adjacent lines of attachment and through the sheet to form the lobes therein.

8. Apparatus as defined in claim 7 wherein said guide means comprises a plurality of generally U-shaped guide members extending in spaced relation across the path of travel of the sheet and substrate and dimensioned to separate the contiguous faces of the same, and said means for cutting the sheet comprises a plurality of heated wires mounted in spaced relation across the path of movement of the sheet and substrate with a wire positioned within the confines of each of said U-shaped guides, and means to reciprocate each wire within the confines of its U-shaped guide to cut the sheet without contact with the substrate during their movement to form a plurality of lobes in the sheet.

9. Apparatus for producing a composite camouflage construction comprising means for conveying an indefinite length net substrate and a continuous sheet in contiguous facing relation along the desired path of travel, means in the path of travel for bonding the sheet and substrate together along generally parallel spaced lines of attachment positioned parallel to their path of travel, means positioned in the path for spacing apart the substrate and sheet between their parallel lines of attachment and for cutting the sheet between adjacent lines of attachment to form lobes in the sheet, each lobe having a base portion attached to the substrate, and an outer end portion free of the substrate whereby the lobes of the sheet simulate the appearance of natural objects of a terrain.

* * * * *